(12) United States Patent
Horvat et al.

(10) Patent No.: US 9,702,965 B2
(45) Date of Patent: Jul. 11, 2017

(54) METHOD AND RELATED MOBILE DEVICE FOR REFERENCE SIGNAL TIME DIFFERENCE BASED LOCALIZATION

(71) Applicant: Intel IP Corporation, Santa Clara, CA (US)

(72) Inventors: Michael Horvat, Munich (DE); Zhibin Yu, Dresden (DE); Tian Yan Pu, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 246 days.

(21) Appl. No.: 14/580,685

(22) Filed: Dec. 23, 2014

(65) Prior Publication Data

US 2015/0215884 A1 Jul. 30, 2015

(30) Foreign Application Priority Data

Jan. 28, 2014 (DE) .......................... 10 2014 100 975

(51) Int. Cl.
*G01S 5/02* (2010.01)
*G01S 5/10* (2006.01)
*H04L 27/26* (2006.01)
*H04W 64/00* (2009.01)

(52) U.S. Cl.
CPC .......... *G01S 5/0294* (2013.01); *G01S 5/0221* (2013.01); *G01S 5/10* (2013.01); *H04L 27/266* (2013.01); *H04L 27/2665* (2013.01); *H04L 27/2675* (2013.01); *H04L 27/2688* (2013.01); *H04L 27/2695* (2013.01); *H04W 64/003* (2013.01)

(58) Field of Classification Search
CPC . G01S 5/0294; H04L 27/266; H04L 27/2665; H04L 27/2675; H04W 64/003
See application file for complete search history.

(56) References Cited

U.S. PATENT DOCUMENTS

| | | | |
|---|---|---|---|
| 2013/0336133 A1* | 12/2013 | Carbonelli | .......... H04L 25/0232 370/252 |
| 2014/0370915 A1* | 12/2014 | Jung | ..................... H04W 64/00 455/456.1 |

* cited by examiner

*Primary Examiner* — David Oveissi
(74) *Attorney, Agent, or Firm* — Schwegman Lundberg & Woessner, P.A.

(57) ABSTRACT

Acquisition and tracking modes for a mobile device assisted multilateration based localization are disclosed. A relative time difference is determined between a positioning reference cell and at least two other detectable positioning cells. A reference signal of a positioning cell is detected to determine timing of a detectable positioning cell by either applying sliding window approach to acquire the positioning cell or a single window approach to track the positioning cell. The sliding window approach within a search window is applied to acquire the positioning cell when a coarse timing of the positioning cell has not yet been achieved. A single window approach is applied to track the positioning cell when a coarse timing of the positioning cell has been achieved or when the search window is not larger than a capture range capability of the mobile device.

18 Claims, 5 Drawing Sheets

METHOD AND RELATED MOBILE DEVICE FOR REFERENCE SIGNAL TIME DIFFERENCE BASED LOCALIZATION

PRIORITY APPLICATION

This application claims the benefit of priority to German Application No. 10 2014 100 975.4, filed Jan. 28, 2014, which is incorporated herein by reference in its entirety.

FIELD OF THE INVENTION

The present disclosure relates to a method and related mobile device for determining a reference signal time difference for the purpose of localizing a mobile device.

BACKGROUND OF THE INVENTION

A mobile device can be localized by a multilateration method in which the mobile device measures the time difference between some specific reference signals originating from several base stations deployed in the network and reports these time differences to a specific device in the network. The specific device calculates the position of the mobile device based on these time differences and knowledge of the locations of the base stations. The mobile device must measure time differences from at least three base stations to support a two-dimensional position determination. The two-dimensional position determination does not comprise a determination of the altitude of the mobile device. The accuracy of the multilateration method depends on the resolution of the time difference measurements, the geometry of the neighboring base stations and the signal environment.

In mobile communications a plurality of localization methods based on multilateration have been standardized so far, for example Enhanced Observed Time Difference (E-OTD), Observed Time Difference of Arrival (OTDOA) and Wireless Assisted Global Positioning System (A-GPS).

E-OTD has been designed for GSM (Global System of Mobile Communications) and GPRS (General Packet Radio Service). In GSM, the mobile device monitors transmission bursts from a plurality of neighboring base stations and measures the time differences between the arrivals of the GSM frames from the base stations to which it is communicating. These observed time differences are used to trilaterate the position of the mobile device.

OTDOA has been designed for UMTS (Universal Mobile Telecommunications System) and LTE (Long Term Evolution). The OTDOA location server estimates the position of a mobile device by referencing the timing of signals as they are received at the mobile device from a minimum of three base stations. The position of the mobile device is at the intersection of at least two hyperbolas defined by the observed time differences of arrival of the UMTS or LTE frames from multiple base stations.

Specifically in LTE, the UE (user equipment=mobile device) is required to detect positioning-specific reference signals (PRS) and/or alternatively the cell-specific reference signals (CRS) transmitted from several eNBs (evolved NodeB=base station) and measure the reference signal time difference (RSTD) between a chosen positioning reference cell eNB and each other detectable positioning neighbor cell eNB using the PRS. The network is not obligated to be synchronized at the transmit antenna connectors. The UE reports the estimated RSTD values to the network in the specified LTE positioning protocol (LPP), in particular to the evolved service mobility location centre (E-SMLC). For the RSTD measurement, the UE is supported by the E-SMLC, which provides assistance data to the UE via LPP, e.g. list of positioning cell IDs, CPs, PRS occasions, PRS offsets and repetition periods, search window, etc. The UE has to estimate the RSTD values with a minimum accuracy requirement. The serving cell, to which the UE is perfectly synchronized, must be in the set of positioning cell IDs to recover the system frame number (SFN) of at least one positioning cell eNB.

The search window to be used can be derived from assistance data conveyed by the E-SMLC to the UE and limits the search range, in which the UE has to search for PRS occasions. The maximum time offset between the centre of the search window and the reference cell PRS occasion is limited to 800 us, cell maximum span of the search window is limited to 199.8 us. The latter time value sets the actual search range for any applied RSTD estimation algorithm.

The search window of 199.8 us equals 2.8 OFDM symbol frames (including CP) or 0.2 subframes. The PRS are detected after FFT processing. The UE is only synchronized to the serving cell. In the beginning of the RSTD estimation, the UE is not synchronized to any other cell, e.g. none of the positioning cells. Any PRS-/CRS-based estimation method, which accurately estimates the exact OFDM (orthogonal division multiplexing) frame time offset between the positioning reference cell and the positioning neighbor cell has a limited capture range. The synchronization algorithm resolving this time sample offset is referred as fine timing. The capture range of fine timing is defined by the frequency distance between two subsequent PRS/CRS resource elements (REs), e.g. their subcarrier distance. Beyond this time range, the estimation becomes ambiguous due to the cyclic property of the FFT (Fast Fourier Transform) exponentials. For an OFDM system the capture range depends on the subcarrier spacing. For an LTE system with 15 kHz subcarriers spacing, the maximum capture range results in 66.66 us=$^1/_{15}$ kHz, which is much smaller than the maximum search window span of 199.8 us. Therefore an additional OFDM frame synchronization is necessary to cover the maximum search window which can be achieved by a sliding window approach.

A sliding window approach, however, is time consuming. This problem arises with any mobile communication technology or standard in which the capture range of the mobile device is smaller than the size of the search window. Thus, a solution that speeds up the reference signal time difference estimation is desirable.

DISCLOSURE OF THE INVENTION

This solution is achieved with a method according to the independent method claim and a related mobile device according to the independent apparatus claim. The dependent claims relate to further aspects of the present solution.

BRIEF DESCRIPTION OF THE DRAWINGS

The method and related mobile device according to the invention are described in more detail herein below by way of exemplary embodiments and with reference to the attached drawings, in which.

DETAILED DESCRIPTION

Figure 1:
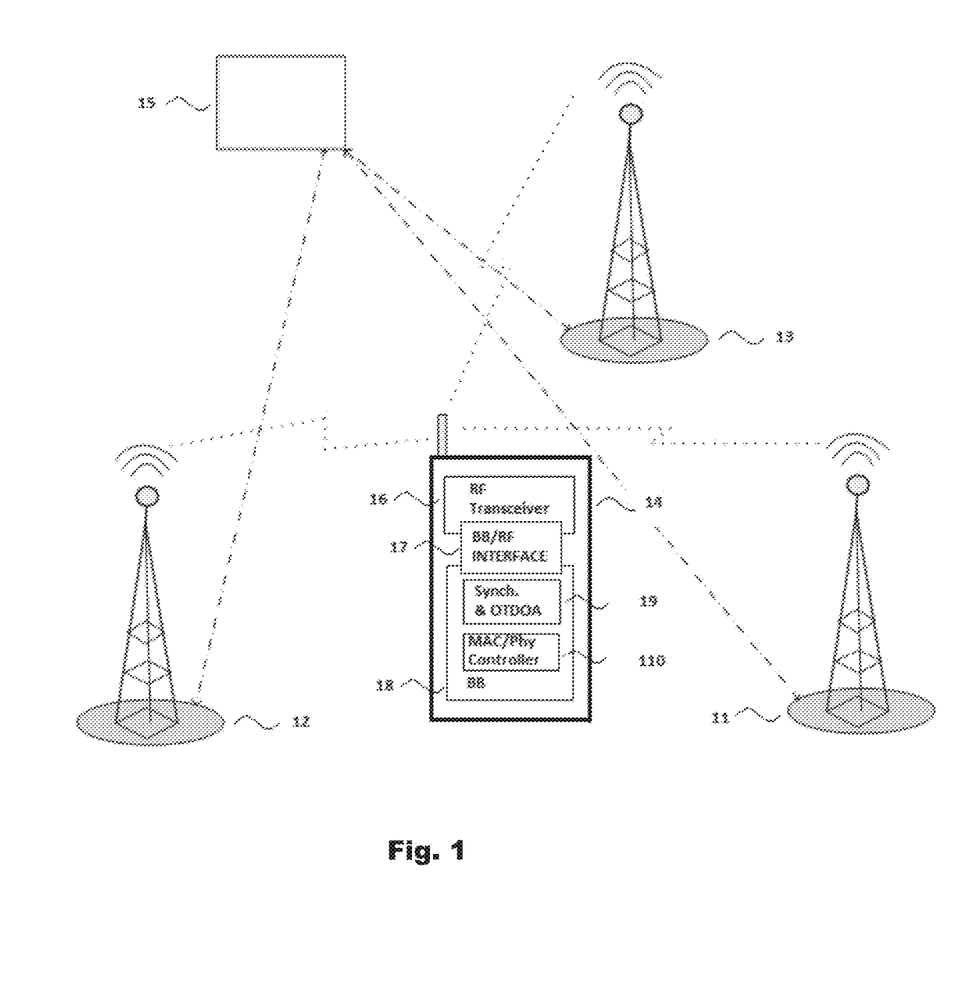
FIG. 1 shows a block diagram of a mobile device to be located in a mobile communication system.

FIG. 1 shows a mobile communication system comprising three base stations 11, 12, 13, a mobile device 14 and a location server 15 such as an LTE Positioning Protocol (LPP) server. The position of the mobile device 14 within the mobile communication system can be determined by a mobile device assisted multilateration based localization method in which the mobile device 14 measures the time difference of reference signals transmitted from the three base stations 11, 12, 13. The location server 15 calculates the position of the mobile device based on these time differences and knowledge of the locations of the base stations 11, 12, 13. As the location server 15 is aware of the locations of the base stations 11, 12, 13 in the network and the base station to which the mobile device 14 is attached and synchronized to, it may provide assistance information to the mobile device, specifically with respect to an expected timing of reference signals originating from the base stations. The expected timing is communicated as a search window to the mobile device 14. The communicated search window, however, may be greater than the capture range capability of the mobile device 14.

The method according to the present disclosure introduces acquisition and tracking modes for a mobile device assisted multilateration based localization method. The method is employed for determining a relative time difference between a positioning reference cell and at least two other detectable positioning cells. A positioning cell is a cell originating from a base station that can be used to localize the mobile device. The signal originating from a positioning cell comprises a reference signal that can be used to localize the mobile device. A timing of positioning cell is equivalent to a timing of the reference signal of the positioning cell. The reference signal may be a positioning reference signal (PRS) or a cell-specific reference signal (CRS).

The method includes in a mobile device attempting to detect a reference signal of a positioning cell to determine the timing of a detectable positioning cell by either applying sliding window approach to acquire the positioning cell or a single window approach to track the positioning cell. The sliding window approach within a search window is applied to acquire the positioning cell when a coarse timing of the positioning cell has not yet been achieved. A coarse timing is said to be achieved when only a fine timing is further required. This is the case when the remaining search window has a size that is not larger than the capture range capability of the mobile device. Conversely, a single window approach is applied to track the positioning cell when a coarse timing of the positioning cell has been achieved or when the search window is not larger than a capture range capability of the mobile device. Ultimately, the method includes computing the time difference between the positioning reference cell and the at least two other detectable positioning cells.

FIG. 1 shows a mobile device 14 for performing the mobile device assisted multilateration based localization method. Specifically, the mobile device as shown may be compliant to mobile communication standards, such as LTE. It comprises a radio frequency (RF) module including an RF transceiver 16, a base band (BB) module 18 to perform base band processing and/or a BF/RF interface 17. The BB module 18 comprises a Synchronization & OTDOA (Observed Time Difference of Arrival) module 19 that performs the mobile device assisted multilateration based localization method. The method according to the present disclosure controls the multilateration based localization and determines the search window for each cell participating in the method based on its self-learning and information from location server 15. The BB module 18 further comprises a Medium Access Layer (MAC)/Physical Layer (Phy) controller 110 that provides positioning cell information from the currently serving cell originated from the location server 15 to the Synchronization & OTDOA module 19.

Figure 2:
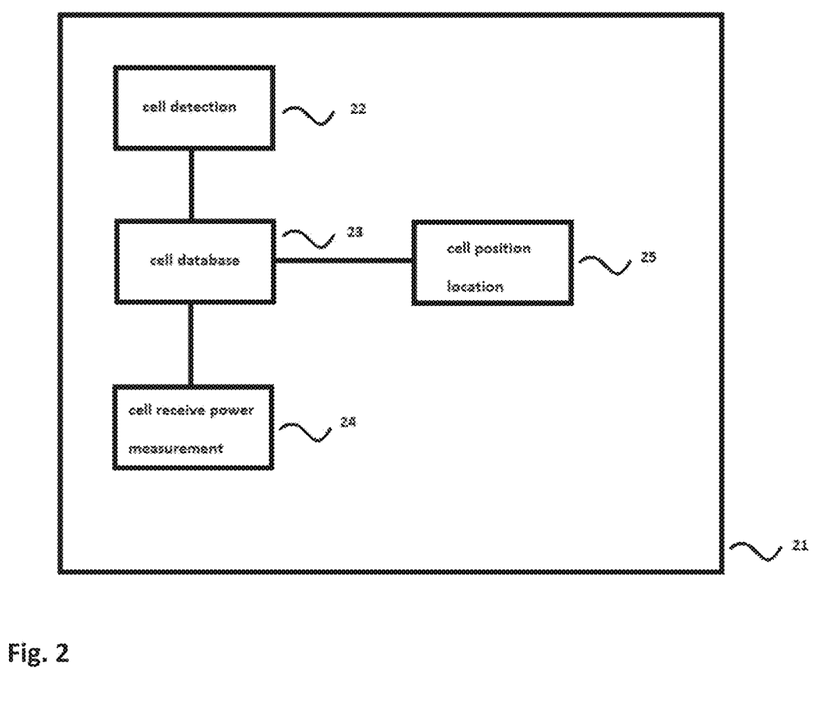
FIG. 2 shows a block diagram of a synchronization module of the mobile device.

FIG. 2 shows a more detailed diagram of Synchronization & OTDOA module 19. It comprises a cell detection module 22 that performs a cell search based on cell-specific reference signals. Cell IDs of detected cells are stored to the cell data base 23. As the multilateration based localization method is based on estimation of time differences of reference signals from detectable positioning cells, the cell data base 23 provides the cell IDs of the detected cells to the cell position location module 25. The cell position location module 25 then estimates the time differences of the reference signals. The cell IDs are also provided to the cell receive power measurement module 24 used for RSRP (reference signal receive power)/RSRQ (reference signal receive quality) measurement. The person skilled in the art will appreciate that allocation of specific stages of the multilateration based localization method is just an example. The stages may be allocated to different modules implemented in software or dedicated hardware.

From FIG. 2 it is clear that a frequency domain approach is hardware efficient in an OFDM system as the OFDM demodulation is typically carried out in the frequency domain and parts of the OFDM demodulation chain such as FFT and RS demodulation implemented in the cell detection module 22 can be reused. In a frequency domain approach attempting to detect a reference signal of a positioning cell comprises either applying a sliding window fourier transform to acquire the positioning cell or applying a single window fourier transform to track the positioning cell. However, the method works as well in time domain.

Switching between acquisition and tracking modes will be explained with reference to FIG. 3.

Figure 3:
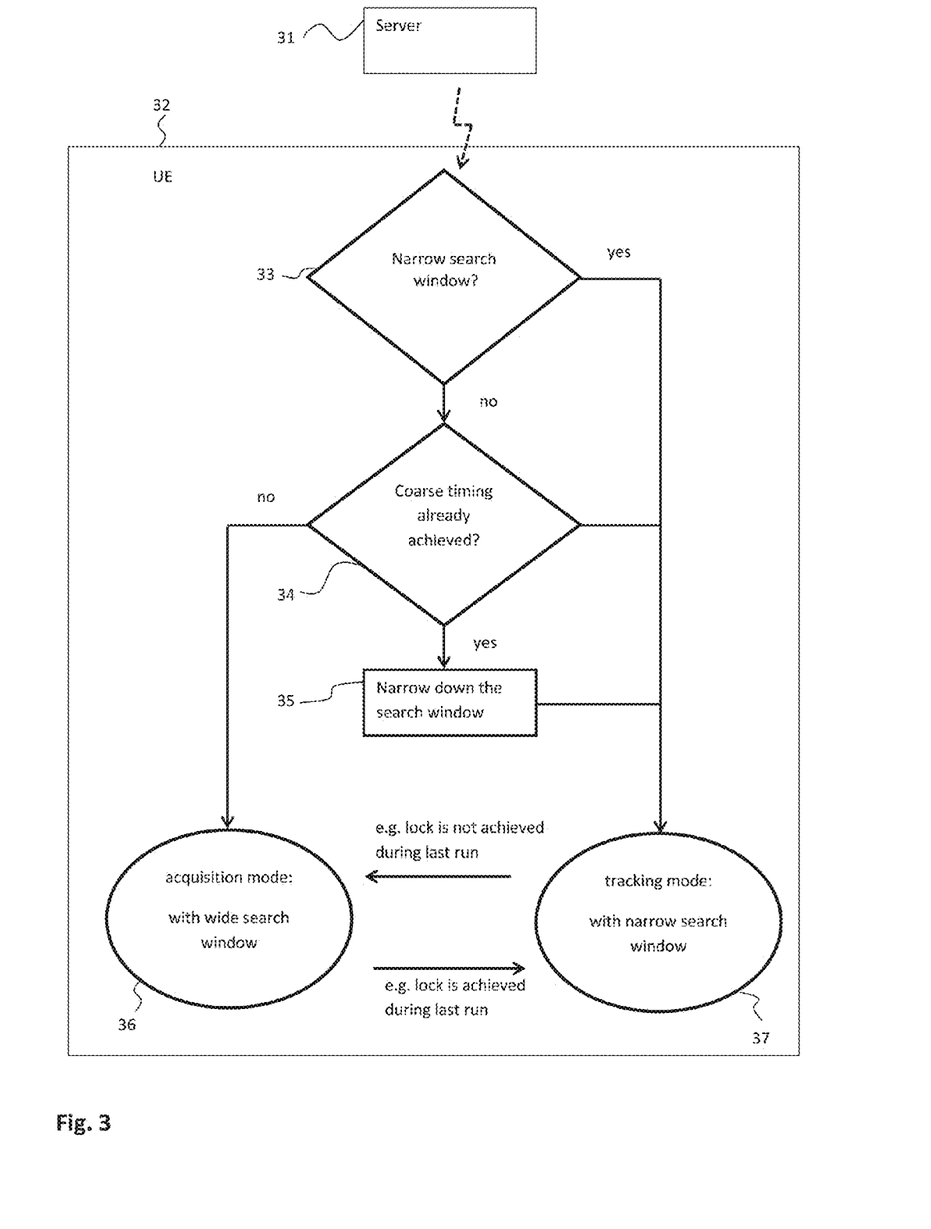
FIG. 3 shows a flow chart of a mobile device assisted multilateration based localization method employing an acquisition mode and a tracking mode.

FIG. 3 shows a location server 31 and an LTE compliant mobile device 32, referred to as user equipment (UE), although the mobile device can also be compliant to another standard.

With reference to FIG. 3, for each cell configured for OTDOA measurement, the initial mode classification procedure is performed by the cell position location module 25 as shown in FIG. 2 and can be described as follows:

The location server 31 communicates assistance information to the mobile device 32. The assistance information contains information regarding the maximum search window size.

The mobile device 32 will check whether the search window size from the location server 31 is within the capture range capability provided by the mobile device in tracking mode as shown in stage 33. Specifically, in an OFDM system such as LTE is dependent on the subcarrier spacing.

If that condition is fulfilled, the mobile device puts the positioning cell in tracking mode as shown in stage 37. Otherwise, the method is continued at stage 34, where the mobile device 32 checks whether a coarse timing has been achieved, for example by use of other assistance signals such as CRS or PSS/SSS. If a coarse timing has been achieved, the mobile device 32 narrows the search window down as shown in stage 35 and the mobile device 32 puts the cell into tracking mode as shown in stage 37 using that narrowed down search window. If a coarse timing has not yet been achieved, the mobile device 32 puts the positioning cell into acquisition mode as shown in stage 36, keeping the search window size the same as informed by the location server 31. During acquisition mode, the mobile device 32 performs the sliding fast Fourier transform for all requested cells and checks the detectability for all cells based on measured quality, such as signal-to-interference and noise ratio (SINR). For example, cells with a SINR lower than −13 dB may be discarded and will not be further measured. The unfiltered cells are further put into tracking mode. Hence, filtering cells out may mean that these cells are not investigated in tracking mode and may not be investigated at all at the next tracking cycle. Instead they may be searched again after a larger time interval, again by searching the entire search window as defined by the location server or as given by any other a priori knowledge about the positions.

The two modes, acquisition mode and tracking mode, can be switched based on cell timing identified as follows:

If the cell timing is identified with a good reliability in acquisition mode, the mobile device 32 narrows down the search window size to the capture range capability of the mobile device and puts the cell into tracking mode for the next OTDOA cycle.

If the mobile device 32 fails to locate cell timing with a good reliability, the mobile device 32 puts the cell back into acquisition mode. In that mode, a coarse time acquisition is attempted by applying a wider search window size. Furthermore, in acquisition mode, detectable cells, for example, cells that have been shadowed by buildings etc. and are newly appearing when a UE moves out of the shadow, are identified.

Hence, in the acquisition mode the mobile device searches an entire search window, while in the tracking mode the mobile device narrows down the search window and searches the narrowed down search window.

Figure 4:
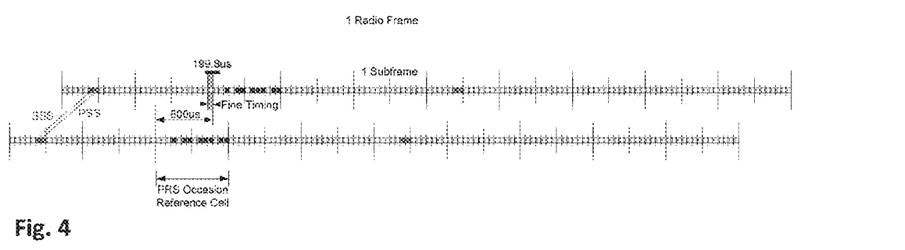
FIG. 4 shows radio frames of a positioning reference cell and radio frames of a detectable positioning cell.

Another way to solve the capture range issue is that to use other assistance signals, for example in an LTE system cell-specific reference signals (CRS) or primary synchronization sequence (PSS)/secondary synchronization sequence (SSS) to perform the coarse timing. The coarse timing will be the input for demodulating the PRS in the frequency domain and then the fine timing is done. Hence, the acquisition mode applying a sliding window approach can be replaced by using other assistance signals to perform the coarse timing as will be explained with reference to FIG. 4 which shows a radio frames of a positioning reference cell (lower part) and radio frames of a detectable positioning cell (upper part). It can be observed that the maximum time offset between the center of the search window and the reference cell PRS occasion is limited to 800 us, while the cell maximum span of the search window is limited to 199.8 us. The latter sets the actual search range for any applied method based on reference signal time differences. For an LTE system with 15 kHz subcarriers spacing, the maximum capture range results in 66.66 us=$\frac{1}{15}$ kHz, which is much smaller than the maximum search window span of 199.8 us. However, if the PRS/CRS—based sliding window approach is replaced by the PSS/SSS-based cell search on a positioning cell list, the residual time offset of PSS/SSS cell search synchronization is in the range of half a cyclic prefix duration. Then, a single windowed PRS fine timing determination can be used to track a detected positioning cell. The PSS/SSS search detects the slot (half-subframe) and radio frame (10 subframes) timing. In addition, cell ID and cyclic prefix type are detected by PSS/SSS cell search. As can be observed in FIG. 4 a unique relationship between the slot/radio frame synchronization and the actual PRS subframe timing exists.

Hence, achieving a coarse timing by employing synchronization signals (PSS/SSS) used for cell search resolves the ambiguity problem of fine timing by applying PSS/SSS cell search on the positioning cell ID list. If the cell searcher detects a positioning cell's PSS/SSS, the slot and radio frame timing are resolved.

Figure 5:
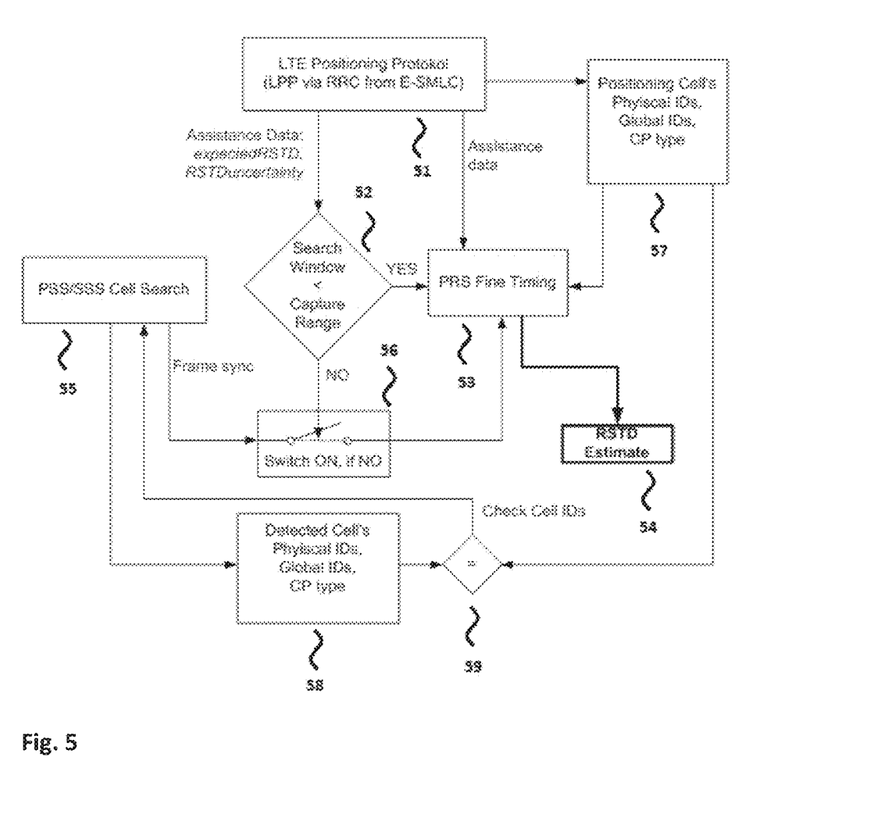
FIG. 5 shows a block diagram of a mobile device assisted multilateration based localization method employing reference signals used for cell search for coarse timing.

The method employing PSS/SSS based coarse timing will be explained with reference to FIG. 5. The location server 51 communicates assistance data using the LTE Positioning Protocol via Radio Resource Control (RRC) from E-SMLC to the mobile device. The assistance data comprises the expected RSTD and search window size referred to as RSTD uncertainty. The mobile device checks whether the search window is smaller than the capture range in stage 52. If this is the case then no coarse timing is required and the mobile device puts the positioning cell into tracking mode and performs the PRS fine timing. Information regarding the positioning cells such as physical IDs, global IDs and cyclic prefix (CP) type is provided by stage 57 to the PRS fine timing stage 53. The PRS fine timing stage 53 will give an RSTD estimate 54. However, if the search window is larger than the capture range, then a coarse timing is performed by PSS/SSS cell search 55. Specifically, a frame synchronization is performed. Once slot and radio frame have been detected by the PSS/SSS search, PRS fine timing 53 can be performed based on the detected slot and radio frame. Furthermore, PSS/SSS cell search also identifies detectable cells in stage 58. The cells identified by PSS/SSS cell search are checked in stage 59 against the positioning cells communicated by the location server 51 to obtain a complete detected positioning cell list which can be tracked by the PRS fine timing stage 53.

The classification in acquisition or tracking mode for each positioning neighbor cell reduces the processing complexity if an excessive RSTD search window has been configured for a positioning cell by the network. In a typical use scenario, most positioning cells can be put into tracking mode after one acquisition run if necessary. As the mobile device requires much less computation power in tracking mode, such a mode classification and modes switch mechanism at the mobile device side leads to a much lower cost and lower power OTDOA measurement solution compared to the solution which carries out OTDOA measurement purely based on assistance information from LPP server. Hence, the method according to the present disclosure minimizes the number of sliding FFTs in the frequency domain approach and saves memory.

Specifically, the present solution solves capture range problem for the frequency domain RSTD estimation approach by introducing acquisition and tracking modes. The frequency domain approach does not require any additional hardware. If the acquisition mode is applied to perform the coarse timing, the proposed solution does not rely on additional LTE assistant signals on other antenna ports.

Another issue that arises with RSTD estimation is a frequency offset between positioning cells. The network cannot be assumed to be synchronized, e.g. time and frequency offsets are present among base stations transmitting PRS. RSTD measurement in the LTE OTDOA framework estimates the relative time difference between the reference/serving cell (eNB) and each of the other detectable positioning cells. Hence, it is a reference signal timing estimation performed by the mobile device in presence of unknown channel condition and carrier frequency offset. These are the major problems to be solved to enable timing estimation at high accuracy.

One way to address this issue is to apply non-coherent combining to the inverse fast Fourier transform (IFFT) results for each of the OFDM symbols, which contains reference signal (RS) resource elements (RE), to enhance RSTD estimation accuracy and totally remove the sensitivity against frequency offsets.

The IFFT size scales the interpolation factor of the resulting time domain signal compared to the received IQ samples, e.g. zero-tailing is applied to fill up the RS number to the IFFT size. The LTE RS neighbor RE have a fixed frequency spacing of 6 subcarriers. In each RS-containing OFDM symbol the RS RE are frequency-shifted by an integer number of subcarriers compared to the neighbor RS OFDM symbols. This means a known frequency offset between each 2 RS OFDM symbols.

The OTDOA framework is not only based on the RS detection of the received signal of the serving cell, but also the detection the PRS of the neighboring cells within the received signal. Since the local oscillators of the individual base stations are not synchronized, a carrier frequency offset must be assumed. The offset becomes an important issue, if PRS from multiple OFDM symbols are combined coherently, e.g. for noise reduction. This offset shifts the subcarrier frequencies and corrupts the OFDM principle. One way to overcome this impairment would be the installation of dedicated frequency offset estimators (FOE) in the UE to each positioning neighbor cell's PRS. Since PRS of up to 15 neighbor cells should be detected for RSTD measurement against the reference cell's timing, the FOE would increase the complexity significantly.

The equation below shows the impact of the unknown frequency offset and the known frequency for a single OFDM symbol m. $S_{m,k}$ denotes the transmitted symbol at subcarrier k, $H_{m,k}$ denotes the channel at subcarrier k and $r_{m,n}$ denotes the time domain signal at time n. The parameter κ describes a fractional subcarrier frequency shift and the parameter $\epsilon_m$ describes an integer subcarrier frequency shift, which is related to the cell ID and frame number, in unit of sample time $T_s$. It can be observed that the parameter κ is the problem of coherent combining.

$$r_{m,n} = \frac{1}{N}\sum_{k=0}^{N-1} S_{m,k} H_{m,k+\kappa} \exp\left(j2\pi n \frac{k+\kappa+\epsilon_m}{N}\right)$$

$$= \frac{1}{N}\exp\left(j2\pi \frac{n\epsilon_m}{N}\right)\exp\left(j2\pi \frac{n\kappa}{N}\right)\sum_{k=0}^{N-1} S_{m,k} H_{m,k+\kappa} \exp\left(j2\pi \frac{nk}{N}\right)$$

$$ABS(r_{m,n}) = \frac{1}{N}ABS\left(\sum_{k=0}^{N-1} S_{m,k} H_{m,k+\kappa} \exp\left(j2\pi \frac{nk}{N}\right)\right)$$

The ABS( )-operation per single IFFT output of the OFDM symbol m discards both, frequency offset and frequency shift. In contrast, the linear average over multiple OFDM symbols prior to IFFT still maintains the phase rotations by frequency offset and shift, as seen in the next equation:

$$r_{m,n} + r_{l,n} = \frac{1}{N}\exp\left(j2\pi \frac{n\epsilon_m}{N}\right)\exp\left(j2\pi \frac{n\kappa_m}{N}\right) \cdot \left\{\sum_{k=0}^{N-1} S_{m,k} H_{m,k+\kappa_m} \exp\left(j2\pi \frac{nk}{N}\right) + \exp\left(j2\pi \frac{n(\epsilon_l - \epsilon_m)}{N}\right)\exp\left(j2\pi \frac{n(\kappa_l - \kappa_m)}{N}\right)\sum_{k=0}^{N-1} S_{l,k} H_{l,k+\kappa_l} \exp\left(j2\pi \frac{nk}{N}\right)\right\}$$

The index κ describes smallest fractional frequency shift of both symbols l and m. The phase change by the known frequency shifts $\epsilon_l$, $\epsilon_m$ can be compensated, but not the phase introduced by $\kappa_l$, $\kappa_m$! Coherent combining severely suffers from the continuous phase change by carrier frequency offset. This even holds when adding 2 subsequent OFDM symbols, e.g. within 1 ms. The reason is the specified frequency error of 0.5 ppm by the eNB's local oscillator as defined by the LTE standard. Applying the error on 2 GHz results in ±1 kHz carrier frequency offset, which is 6.6% of the LTE carrier spacing of 15 kHz!

Non-coherent combining of the IFFT output vectors can be described as the squared sum to generate an averaging gain by the following equation.

$$f_{metric}\left(\sum_{m}^{l} |r_{m,n}|^2 + \ldots + |r_{l,n}|^2\right) = f_{metric}\left(\left|\sum_{k=0}^{N-1} S_{m,k} H_{m,k+\kappa_m} \exp\left(j2\pi \frac{nk}{N}\right)\right|^2 + \ldots + \left|\sum_{k=0}^{N-1} S_{l,k} H_{l,k+\kappa_l} \exp\left(j2\pi \frac{nk}{N}\right)\right|^2\right)$$

All exponentials containing frequency shifts collapse to factor 1 before the summation.

The metric function $f_{metric}(\ )$ resolves the unknown channel paths by using the IFFT.

The metric function is typically set to the MAX( ) function. The number of used output values of the metric function depends on the channel.

Therefore, attempting to detect a reference signal of a positioning cell further includes in an OFDM compliant mobile device non-coherently combining a plurality of OFDM frames when a frequency offset between the positioning reference cell and another detectable positioning cell has not yet been compensated. The non-coherently combining comprises demodulating the reference signal of each of the plurality of OFDM frames; re-modulating the reference signal of each of the plurality of OFDM frames to obtain a reference time signal of the OFDM symbol of each of the plurality of OFDM frames; averaging the reference time signal of each of the plurality of OFDM frames over all OFDM frames to obtain an averaged reference time signal; and searching for the peak of the average reference time signal.

Figure 6:
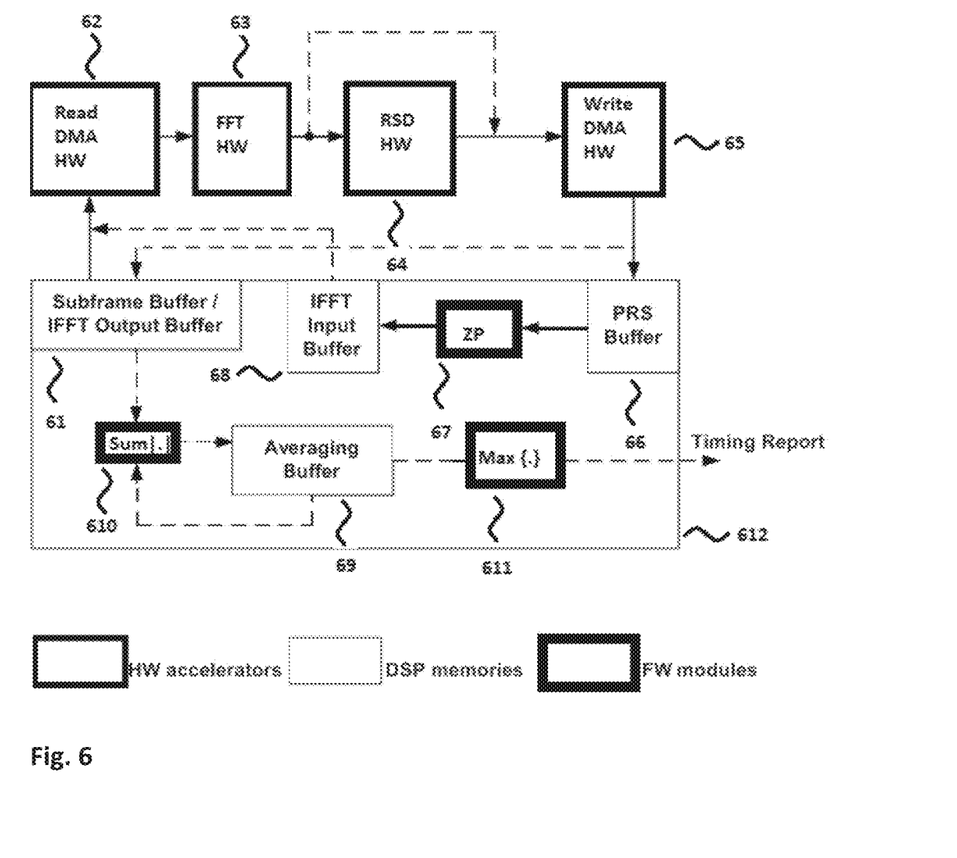
FIG. 6 shows a block diagram of a frequency offset robust method by non-coherent combination of a plurality of frames.

This will be further explained with reference to FIG. 6 showing a digital signal processor 612 implementation with additional hardware accelerators. The solid line refers to the data path for PRS demodulation: The time domain IQ samples are buffered within the sub-frame buffer 61, the Read Direct Memory Access (DMA) hardware (HW) 62 finds the boundaries of the PRS reference OFDM symbols, and further feeds the time domain OFDM symbols from the DSP memory into the FFT HW 63. The FFT HW 63 generates the frequency domain samples and further forwards the samples into reference signal demodulation (RSD) HW 64 to demodulate the PRS. The demodulated PRS is transferred back into the digital signal processor (DSP) memory, specifically into the PRS buffer 66 by the Write DMA HW 65. Hence, the solid lined data path refers to the demodulation of the PRS.

The dashed line in FIG. 6 refers to the data path for IFFT processing and the non-coherent combining: The zero padding (ZP) module 67 appends (pads) the demodulated PRS stored in the PRS buffer 66 with zeros to form a frequency domain sequence with the same length as the IFFT size, and buffers these inside the IFFT input buffer 68. The Read DMA HW 62 further transfers the samples from IFFT input buffer 68 into the FFT HW 63 to perform the IFFT. The RSD HW 64 is by-passed, such that the IFFT outputs are directly forwarded to the Write DMA HW 65 and furthermore transferred back into the IFFT output buffer 61 within the DSP memory (the IFFT output buffer reuses the same DSP memory used by the time domain sub-frame buffer). Hence, the dashed lined data path refers to the re-modulation of the PRS.

The summation module 610 and the averaging buffer 69 ABS accumulate the IFFT outputs over multiple PRS OFDM symbols. The Max module 611 searches for the maximal peak in the averaging buffer 69 and reports the timing.

Conversely, when a frequency offset between the positioning reference cell and another detectable positioning cell has already been compensated, a coherently combining gives a sharper metric. In this case attempting to detect a reference signal of a positioning cell further includes in an OFDM compliant mobile device coherently combining a plurality of OFDM frames by averaging the plurality of OFDM frames to obtain an averaged OFDM frame and attempting to detect the reference signal of a positioning cell using the averaged OFDM frame.

The present disclosure further relates to a mobile device comprising means for reference signal detection of a positioning cell, specifically means for applying a sliding window approach within a search window to acquire the positioning cell and means for applying a single window approach to track the positioning cell.

The present disclosure further relates to a computer readable medium having computer-executable instructions for performing the method as described above.

What is claimed is:

1. A method for determining a location of a mobile device, the method comprising:
receiving, by transceiver circuitry of the mobile device, expected timing information of reference signals from positioning reference cells of a first base station and at least a second base station;
upon determining, by processing circuitry of the mobile device, a size of a search window corresponding to the expected timing information is within a signal capture range of the mobile device:
applying a single window Fourier transform to track the reference signals during tracking mode of the mobile device;
upon determining, by the processing circuitry, the size of the search window is not within the signal capture range of the mobile device:
applying a sliding window Fourier transform to acquire the reference signals during acquisition mode of the mobile device;
computing, by the processing circuitry, a time difference between the reference signals; and
determining, by the processing circuitry, a location of the mobile device based on the computed time difference between the reference signals.

2. The method according to claim 1, wherein when one or more of the positioning reference cells are lost during the tracking, the processing circuitry is configured to apply the sliding window Fourier transform to acquire the reference signals.

3. The method according to claim 1, wherein the positioning reference cell of the first base station is a serving cell to which the mobile device is synchronized to.

4. The method according to claim 1, wherein the processing circuitry is further configured to:
determine a search window for each of the positioning reference cells based on the expected timing information; and
performing the tracking mode or the acquisition mode for each of the determined search window.

5. The method according to claim 1, wherein during applying the single window Fourier transform to track the reference cells, the processing circuitry is configured to:
discard an acquired positioning reference cell with a signal quality metric of a corresponding reference signal below a threshold.

6. The method according to claim 1, wherein during applying the single window Fourier transform to track the reference cells, the processing circuitry is configured to:
narrow down the search window such that the signal capture range of the mobile device is not smaller than the narrowed down search window.

7. The method according to claim 1, wherein the reference signals include a positioning reference signal (PRS) or a cell-specific reference (CRS).

8. The method according to claim 1, wherein during acquisition mode, the processing circuitry is configured to:
determine coarse timing of the positioning reference cells is unavailable upon failing to detect reference signals employed for cell search of the positioning reference cell.

9. The method according to claim 1, wherein the mobile device is a Long Term Evolution (LTE) compliant mobile device configured for determining the coarse timing by performing a cell search synchronization based on a primary synchronization sequence (PSS) and a secondary synchronization sequence (SSS), and determining the timing of the PSS and the SSS.

10. The method according to claim 9, wherein during the tracking mode, the processing circuitry is configured to:
determine coarse timing of the positioning reference cells is achieved wherein determining the coarse timing comprises detecting slot timing and radio frame timing based on the PSS and the SSS.

11. The method according to claim 10, the method further comprising:
determining a fine timing by estimating a residual time offset between the determined coarse timing of a positioning reference signal (PRS) orthogonal frequency division multiplexing (OFDM) frame of the positioning reference cell and a PRS OFDM frame of a detectable positioning cell.

12. The method according to claim 11, wherein determining the fine timing comprises detecting, by the processing circuitry, a PRS sub-frame timing.

13. The method according to claim 1, the method further comprising:

receiving, by the transceiver circuitry of the mobile device, assistance information from a serve, the assistance information comprising at least one of the following:

size of the search window, positioning cells identifiable by their physical id and global id, or cyclic prefix type.

14. The method according to claim 1, wherein the mobile device is an orthogonal frequency division multiplexing (OFDM) compliant mobile device, and the method further comprises:

detecting at least one of the reference signals from the positioning reference cells, the detecting comprises non-coherently combining, by the processing circuitry, a plurality of OFDM frames when a frequency offset between one of the positioning reference cells and another detectable positioning cell of the reference cells has not yet been compensated, the non-coherently combining comprising:

demodulating a reference signal of each of the plurality of OFDM frames;

re-modulating the reference signal of each of the plurality of OFDM frames to obtain a reference time signal of the OFDM symbol of each of the plurality of OFDM frames;

averaging the reference time signal of each of the plurality of OFDM frames over all OFDM frames to obtain an averaged reference time signal; and searching for the peak of the average reference time signal.

15. The method according to claim 1, wherein the mobile device is an orthogonal frequency division multiplexing (OFDN) compliant mobile device, and the method further comprises:

detecting at least one of the reference signals from the positioning reference cells, the detecting comprises coherently combining, by the processing circuitry, a plurality of OFDM frames when a frequency offset between one of the positioning reference cells and another detectable positioning cell of the reference cells has been compensated, the coherently combining comprising:

averaging the plurality of OFDM frames to obtain an averaged OFDM frame; and attempting to detect the at least one reference signal of the positioning reference cell using the averaged OFDM frame.

16. The method according to claim 1, wherein during the tracking mode, the processing circuit is configured to:

determine coarse timing of the positioning reference cells is achieved, wherein determining the coarse timing comprises detecting slot timing and radio frame timing based on one or more synchronization signals from the positioning reference cells;

narrow down the search window such that the signal capture range mobile device is not smaller than the narrowed down search window.

17. A mobile device comprising hardware processing circuitry configured to perform synchronization including detection of a reference signal of a positioning cell, the hardware processing circuitry further configured to:

determine a search window corresponding to expected timing information of the reference signal;

apply a single window Fourier transform to track the reference signal during tracking mode of the mobile device, when a size of the search window is within a signal capture range of the mobile device;

apply a sliding window Fourier transform to acquire the reference signal during acquisition mode of the mobile device, when the size of the search window is not within the signal capture range of the mobile device;

compute a time difference between the reference signal and at least another reference signal from at least another positioning cell; and determine a location of the mobile device based on the computed time difference.

18. A non-transitory computer-readable storage medium that stores instructions which when executed by one or more hardware processors of a mobile device, cause the mobile device to:

receive expected timing information of reference signals, the reference signals from positioning reference cells of plurality of base stations;

determine a search window corresponding to the expected timing information:

perform one of:

applying a single window Fourier transform track the reference signals, upon determining a size of the search window is within a signal capture range of the mobile device;

applying a sliding window Fourier transform to acquire the reference signals, upon determining the size of the search window is not within the signal capture range of the mobile device;

compute a time difference between the reference signals; and determine a location of the mobile device based on the computed time difference between the reference signals.

* * * * *

UNITED STATES PATENT AND TRADEMARK OFFICE
CERTIFICATE OF CORRECTION

PATENT NO. : 9,702,965 B2  
APPLICATION NO. : 14/580685  
DATED : July 11, 2017  
INVENTOR(S) : Horvat et al.

Page 1 of 1

It is certified that error appears in the above-identified patent and that said Letters Patent is hereby corrected as shown below:

On the Title Page

In item (30), in "Foreign Application Priority Data", in Column 1, Line 1, delete "10 2014 100 975" and insert --10 2014 100 975.4-- therefor In the Claims

In Column 10, Line 52, in Claim 10, after "achieved", insert --,--

In Column 11, Line 2, in Claim 13, delete "serve," and insert --server,-- therefor In Column 12, Line 4, in Claim 16, after "range", insert --of the--

In Column 12, Line 35, in Claim 18, delete "information:" and insert --information;-- therefor Signed and Sealed this  
Fourteenth Day of April, 2020

Andrei Iancu  
*Director of the United States Patent and Trademark Office*